R. S. FEND.
AUTOMOBILE.
APPLICATION FILED JUNE 26, 1915.
1,275,011.
Patented Aug. 6, 1918.
2 SHEETS—SHEET 2.
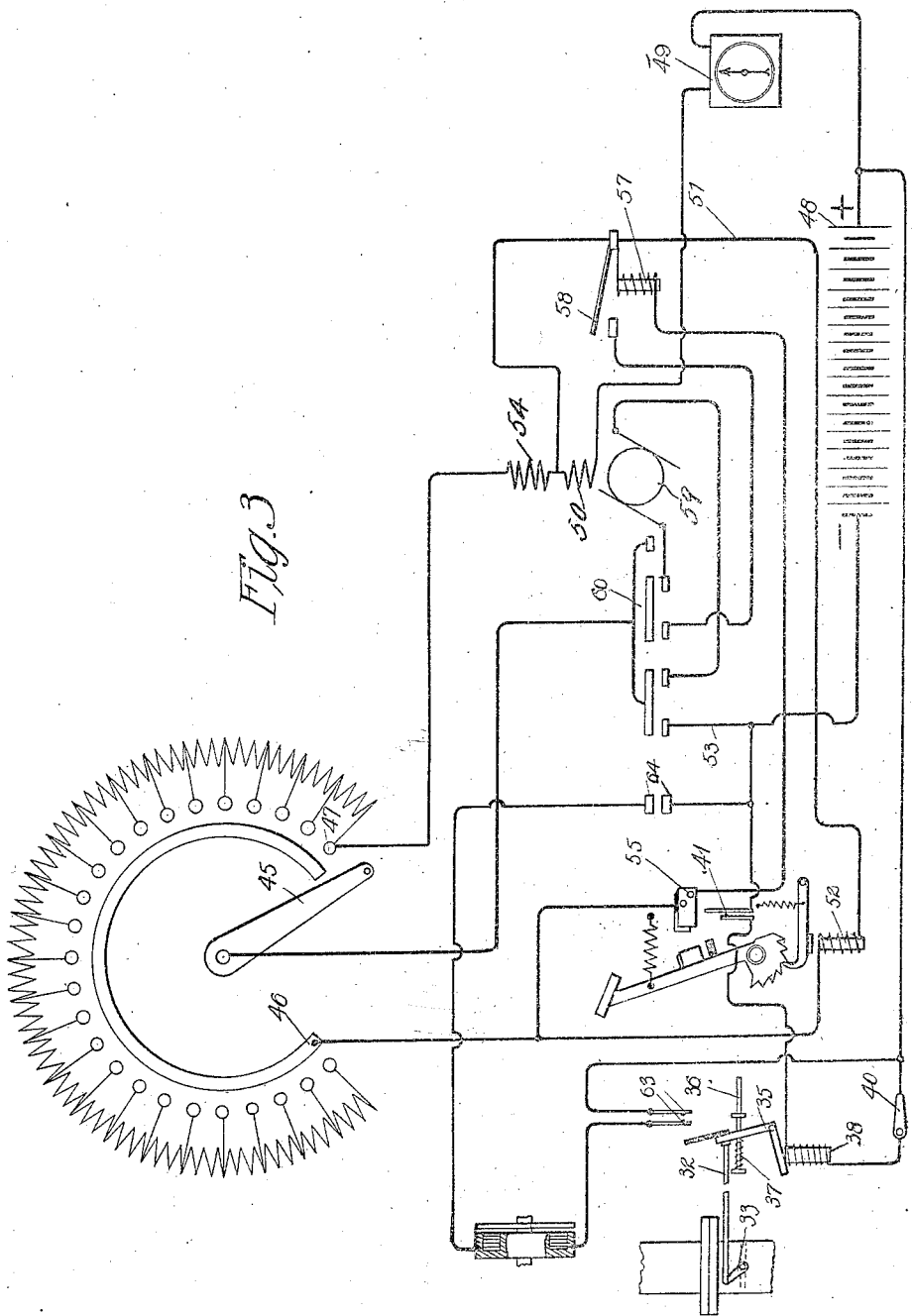

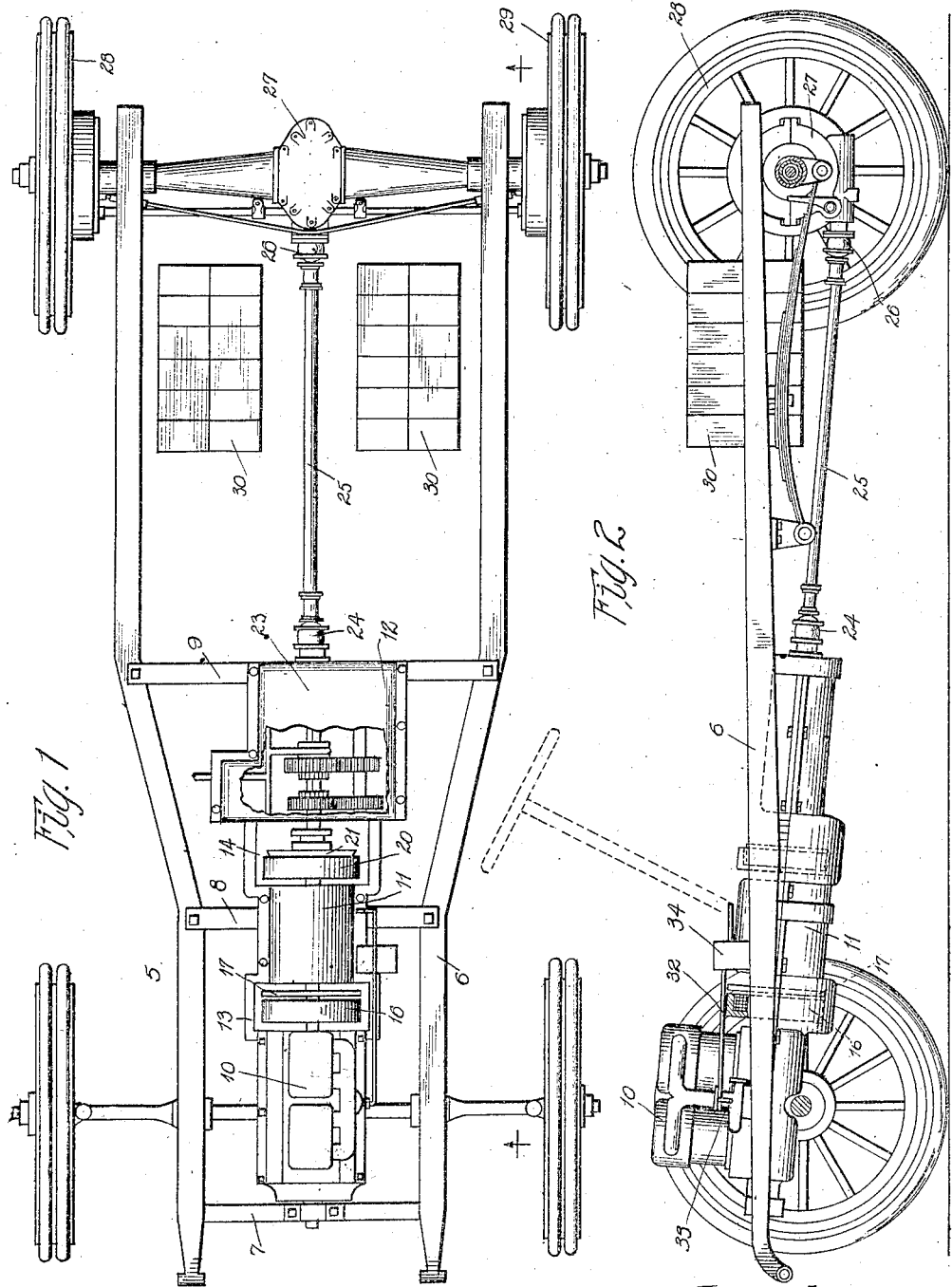

UNITED STATES PATENT OFFICE.

ROLAND S. FEND, OF CHICAGO, ILLINOIS, ASSIGNOR TO WOODS MOTOR VEHICLE COMPANY, OF CHICAGO, ILLINOIS, A CORPORATION OF ILLINOIS.

AUTOMOBILE.

1,275,011.  Specification of Letters Patent.  Patented Aug. 6, 1918.

Application filed June 26, 1915. Serial No. 36,595.

*To all whom it may concern:*

Be it known that I, ROLAND S. FEND, a citizen of the United States, residing at Chicago, in the county of Cook and State of Illinois, have invented a certain new and useful Improvement in Automobiles, of which the following is a full, clear, concise, and exact description, reference being had to the accompanying drawings, forming a part of this specification.

My invention relates to motor vehicles of the type provided with both gasolene and electric propulsion motors.

Vehicles provided with gasolene engines as their sole motive power are required to carry engines of sufficient power to produce rapid acceleration and rapid hill climbing. The engine necessary for producing a satisfactory acceleration is necessarily of considerable weight, thus requiring the chassis structure to be of correspondingly heavy weight.

Vehicles driven purely by electric motors must likewise have a strong and consequently heavy chassis construction in order to carry the large storage batteries necessary for enabling the vehicle to travel a sufficient distance upon a single charge to make its use satisfactory under existing operating conditions, especially in competition with purely gasolene cars which have a touring distance greatly in excess of that of electric motor driven vehicles.

By a suitable combination of gasolene engine and electric dynamo I am able to considerably reduce the weight of the motor mechanism: I am able to reduce the size of the storage battery to substantially one-half that which was heretofore provided in good commercial vehicles: and I am able to simplify the control so that under ordinary running conditions the control of my vehicle is as simple as that of a purely electric automobile. I have found that the engine and electric dynamo may both be reduced in size to such an extent that each has a power capacity of substantially half that which was heretofore provided for vehicles of the same weight and speed capacity, the combined power of the engine and dynamo, however, being substantially equal to that which has been heretofore provided in a single power element. I contemplate using a gasolene engine having slightly more power at its rated speed than that of the dynamo at its rated speed.

By interposing between the electric dynamo and the driven axle of the vehicle a change gear, or speed ratio changing mechanism, I am able to operate my dynamo either as a motor or a generator at any car speed, that is, if the charge in the batteries is low and it is desired to bring them up rapidly while driving the vehicle at a low speed by shifting the ratio changing gears interposed between the dynamo and the rear axle the engine and dynamo may be driven at high speed, while at the same time the vehicle is propelled only at a low, or moderate, speed.

In order that the dynamo may be driven in a reverse direction when it is desired to back up the vehicle without rotating the gasolene engine in its reverse direction; and further, in order that the vehicle may be propelled in a forward direction by means of the electric dynamo without the load incident to the rotation of the gasolene engine shaft, I have provided a magnetic clutch between the engine and the dynamo the circuit of which is preferably carried through contacts associated with the reversing switch so that it is impossible to reverse the direction of the electric dynamo without first disconnecting it from the engine.

The electric dynamo which I prefer to use with my invention is slightly compounded, that is, its principal field is made up of shunt turns though this field is augmented by a few series turns which act to increase the field magnetization when the dynamo is driven as a motor from the storage battery, but which act to slightly demagnetize the field when the dynamo is driven as a generator. This arrangement has the effect that for any specific energization of the shunt field winding a rather wide variation in speed will be required in changing the dynamo into a generator. At the same time the bucking effect of the series turns is such that if the dynamo is driven at a very high speed by means of the engine the field will be so weakened by the series turns that the storage battery will not be charged at an unduly high rate.

I preferably place a switch under the control of the foot brake lever which prevents the dynamo armature circuit being closed when the brake is depressed, and I also preferably control by the same lever a pair of switch contacts which act to close a circuit whenever the brake is depressed, which acts upon the gasolene throttle to reduce the gasolene engine to its minimum gas supply so that the gasolene engine will not race when the foot brake is operated.

My invention is illustrated in the accompanying drawings in which like characters designate like parts throughout the several views, and in which—

Figure 1 is a plan and Fig. 2 an elevation of the chassis showing the arrangement of the essential elements thereon; and Fig. 3 is a diagram of the essential circuits.

The chassis may be of any usual and well-known construction and, as here illustrated, comprises the channel members 5 and 6 and joining members 7, 8, and 9 upon which the engine 10, dynamo 11, ratio changing mechanism 12, electro-magnetic clutch 13, and cone clutch 14 are supported. The crank case of the gasolene engine is preferably made integral with the lower half of the casing for the clutches, dynamo, and gear shift mechanism though this is not essential, it being possible to use articulated parts which may be bolted together in a well-known manner.

The coil housing 16 of the electro-magnetic clutch 13 is preferably mounted upon the crank shaft of the engine 10, while the movable disk 17 of the clutch 13 is preferably mounted upon the end of the armature shaft of the dynamo 11. The part 20 of the cone clutch 14 is mounted upon the rear end of the dynamo armature shaft, while the cone 21 of this clutch is secured to the shaft which extends into the gear housing 12. The gear shift mechanism here illustrated is intended to be typical of well-known sliding gear transmissions with the exception that no reverse mechanism is necessary on account of the ease with which the circuits may be changed to drive the electric dynamo in the reverse direction. The arrangement of gears here illustrated provides only for two forward speeds though it is obvious that a greater number could be provided if it were deemed advisable. The shaft 23, where it extends rearwardly from the gear housing, is provided with a universal joint 24 connecting it with the propeller shaft 25 which in turn is connected through a second universal joint 26 with the worm driven differential inclosed within the housing 27 and communicating power to the rear wheels 28 and 29 in a well-known manner.

The storage batteries 30, here merely diagrammatically illustrated, are supported on the body portion of the car, not herein illustrated, in substantially the position shown, though it is to be understood that they may be differently distributed if the particular shape of the car body requires.

The operating rod 32 for the carbureter throttle 33 is carried into the housing 34 which contains an electromagnetic device, illustrated in Fig. 3, and comprising a bell crank armature lever 35 to the projecting end of which the operating rod 32 is pivoted. The operating rod 36, which extends to the usual throttle lever mechanism, passes through an opening in the bell crank lever 35 and is provided with a spring 37 on the forward side of the member 35, which, under ordinary circumstances, permits the throttle 33 to be controlled through the reciprocation of the rod 36. However, no matter in what position the rod 36 is placed the excitation of the electromagnet 38 causes the bell crank lever 35 to move forward to a position in which it throttles down the engine to its minimum gasolene supply. The circuit of the magnet 38 is controlled through a manually operated switch 40 and the pair of contacts 41 which are closed whenever the brake lever is pressed out of its retracted position. It is to be understood that the switch 40 may be associated with the usual throttle lever so that when the engine is throttled down manually the circuit of the electromagnet 38 will be opened, thus saving a continued drain upon the battery. The purpose of this electromagnetic throttle control arrangement is to prevent racing the engine when the foot brake is depressed and the armature circuit interrupted, as will be hereinafter described.

In Fig. 3 I have illustrated in addition to the circuit described in the foregoing paragraph the principal power circuit for the electric motor. In the operation of this circuit the movement of the lever 45, which is preferably controlled from the steering post, into its first position, brings it into circuit with the segment 46 and with the rheostat contact 47. The circuit is thereby completed from the positive pole of the storage battery 48 through the ampere hour meter 49, a few series coils 50 wound about the field poles of the dynamo conductor 51, the coil of electromagnet 52, segment 46, arm 45 and conductor 53 to the negative pole of battery 48. At the same time a circuit is completed from the positive pole of battery 48 through the watt hour meter 49, series coils 50, the main shunt coils 54 of the dynamo, contact 47, and arm 45 of the rheostat, and conductor 53 to the negative pole of the battery. The current in the first path traced energizes the electromagnet 52 and releases the brake so that the foot pedal either retracts to a position in which the switch 55 is closed, or else it retracts against the pressure of the foot so that it may be later moved to a position in which the switch 55 will be closed. The current through the shunt field coil 54 energizes the shunt field magnetizing the field structure to high saturation.

When the switch 55 is closed the circuit of electromagnet relay 57 is likewise closed and that relay is thereby operated closing the switch 58 which controls the armature circuit of the dynamo. Upon the closure of the switch 58 current flows from the positive pole of battery 48 through the ampere hour meter 49, series field turns 50, switch 58, dynamo armature 59 in either one direction or the other, depending upon the position of the reversing switch 60, back to the negative pole of battery 48. The current in this path, which passes through the series coils of the field, increases the saturation of the motor field providing a very strong field for starting and low speed purposes. As the motor increases in speed the effect of the series coils 50 diminishes and is, in fact, rather slight under ordinary running conditions, that is, when the current draft upon the battery is substantially normal. By advancing the arm 45 over the contacts of the rheostat the current through the shunt field 54 may be diminished and the speed of the dynamo thus increased.

When it is desired to charge the storage battery it is only necessary to move the lever 45 to a position on the rheostat at which the field 54 of the dynamo will receive sufficient current to cause a field magnetization of sufficient strength to generate in the armature a voltage greater than that of the battery at the speed at which the armature is at that time being rotated. Although a reversal of current through the series field coils 50 occurs when the dynamo is operated as a generator, and although this current is in a direction to buck down the magnetism produced by the shunt field coils 54, nevertheless in view of the slight number of series turns 50 and in view of the small current which is ordinarily produced for charging purposes a proper generating action will result.

The circuit of the magnetic clutch 13 is illustrated as passing through a pair of contacts 63 controlled by the armature 35 of the electromagnet 38, and through a second pair of contacts 64 so associated with the reversing switch 60 that they will be opened whenever the switch 60 is moved to its reversing position. It is to be understood that the contacts 63 may be directly associated with the gas lever instead of with the electromagnet 38 so that they will be closed in the first movement of the throttle lever.

Although I have shown and described my invention with reference to a specific structure I do not wish to be unduly limited thereto, many modifications being possible without departing from the spirit or scope of my invention.

Having thus described my invention, what I claim as new and desire to secure by United States Letters Patent is:

1. In a motor vehicle, the combination with a gasolene engine of a gas throttle therefor, mechanical means for operating said throttle, and electro-magnetic means for taking the operation of said throttle out of control of said mechanical means and for closing said throttle.

2. In a motor vehicle, the combination with an internal combustion engine and an electro-magnetic friction clutch, a brake lever, means controlled by the first movement of the brake lever for closing the throttle for said engine from its running position to idling position and for simultaneously opening the circuit of said electro-magnetic clutch, the further movement of said brake lever serving to retard the movement of said vehicle.

3. In a mixed drive for motor vehicles the combination with a brake and a foot pedal for operating it of an electro-mechanically controlled lock for said brake, a dynamo for the vehicle, an operator controlled switch for regulating the speed of said dynamo, said switch serving also to control said electro-magnetic lock for said brake, a gasolene engine, a throttle for the engine, and a pair of switches controlled by said brake operating pedal, one of said switches controlling the throttle for said engine and the other of said switches controlling the dynamo circuit.

4. In a mixed drive for motor vehicles the combination with an internal combustion engine and a dynamo of a throttle for the engine and a switch for the dynamo, a mechanical foot brake for the vehicle, and means responsive to the first movement in the depression of said foot brake for interrupting the circuit of the dynamo and for substantially closing said engine throttle, and means responsive to the further movement of said foot brake for retarding the movement of the vehicle, said further movement being ineffective to change the engine throttle.

5. In a mixed drive for motor vehicles the combination with an internal combustion engine and an electric dynamo of a propeller shaft with which said engine and dynamo may be directly connected for driving the vehicle, a throttle for the engine, an operating circuit for said dynamo, a foot brake for the vehicle, a hand operated speed controlling lever for the dynamo, means under the control of said hand operated lever for releasing the foot brake, and means responsive to the release of the foot brake for opening the engine throttle and completing the dynamo operating circuit.

6. In a mixed drive for motor vehicles the combination with an internal combustion engine and an electric dynamo of a propeller shaft with which said engine and dynamo may be directly connected for driving the vehicle, an electro-magnetic clutch between the engine and the dynamo, a throttle for the engine, an operating circuit for said dynamo, a foot brake for the vehicle, a hand operated speed controlling lever for the dynamo, means under the control of said hand operated lever for releasing the foot brake, and means for opening the engine throttle, completing the dynamo operating circuit, and completing the circuit of said electro-magnetic clutch.

In witness whereof I hereunto subscribe my name this 18th day of June, A. D. 1915.

ROLAND S. FEND.

Witnesses:
THOMAS CLEMENT,
W. B. KENNEDY.